Nov. 30, 1965  L. A. B. PILKINGTON  3,220,816
MANUFACTURE OF FLAT GLASS
Filed Nov. 21, 1962
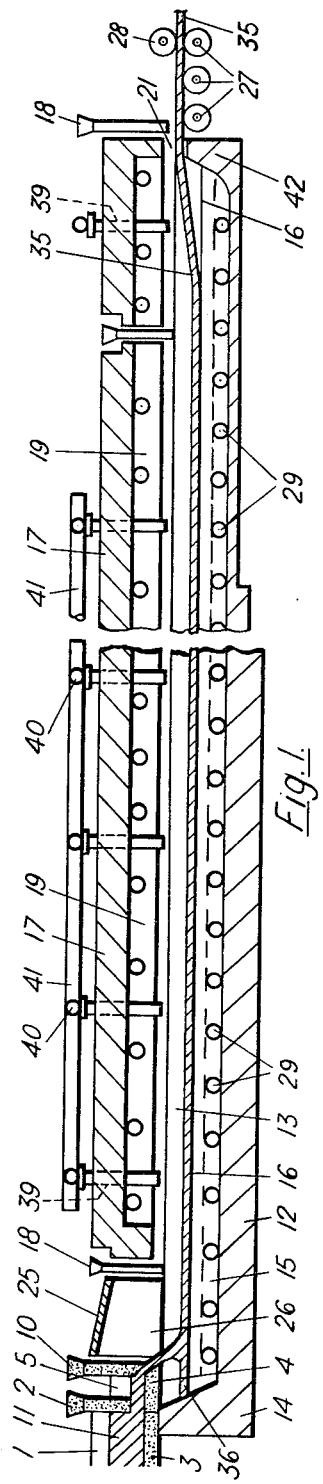
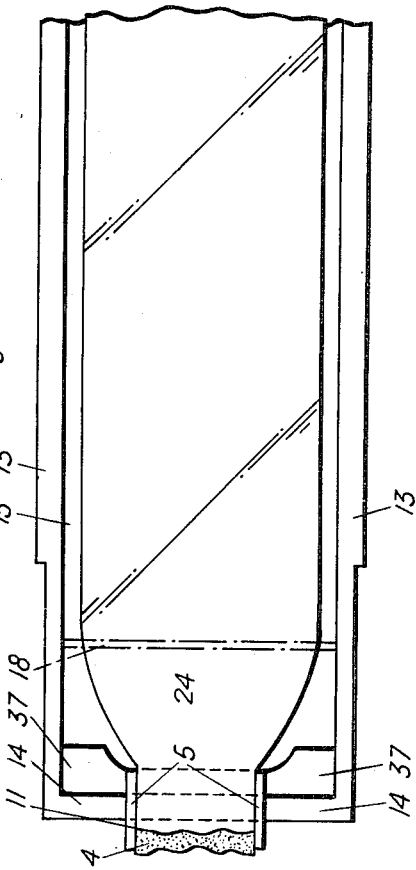
Inventor
L. A. B. Pilkington
By
Norris Kennedy Campbell Attorneys United States Patent Office 3,220,816
Patented Nov. 30, 1965

3,220,816
MANUFACTURE OF FLAT GLASS
Lionel Alexander Bethune Pilkington, Rainhill, England, assignor to Pilkington Brothers Limited, Liverpool, England
Filed Nov. 21, 1962, Ser. No. 239,264
Claims priority, application Great Britain, May 3, 1957, 14,205/57
4 Claims. (Cl. 65—99)

This invention relates to the manufacture of flat glass and is a division from co-pending Application Serial No. 664,245, filed on June 7, 1957, now U.S. Patent No. 3,083,551.

In accordance with the invention described in said application flat glass is produced in ribbon form by a process of manufacture in which glass in a molten state is supplied to one end of a bath of molten metal, advanced along the bath and during the passage along the bath is sufficiently stiffened by cooling, before the glass in ribbon form is discharged from the other end of the bath, in a manner to permit the ribbon to be taken unharmed from the bath.

The method of manufacturing flat glass in accordance with the present invention is characterised by supplying the molten glass to the bath of molten metal at a controlled rate along a channel so as to obtain a free fall of the molten glass from the channel to the bath of molten metal to ensure that, whereas the glass which has formed the upper surface of the glass in the channel continually flows forward into the upper surface of a layer on the bath, the glass which has formed the under surface of the glass in the channel instead of flowing directly into the under surface of said layer flows rearwardly to form the top surface of another layer and a bottom surface is generated for the forwardly flowing glass layer advancing along the bath in which bottom surface distortion derived from physical contact of molten glass with the channel is minimal, regulating the supply to the channel to maintain the formation of the forwardly flowing layer of glass on the bath, and advancing the forwardly flowing layer of glass in ribbon form along the bath, sufficiently cooling the ribbon as it is advanced to permit it to be taken up from the bath surface as the cooled ribbon approaches the discharge end of the bath, and discharging the ribbon from the bath.

The rearward flow on the bath of the glass which had constituted the under surface of the molten glass supplied by the channel is such as to prevent a direct flow of that glass into the under surface of the layer of glass advancing along the bath.

From another aspect a method of manufacturing flat glass in ribbon form during which molten glass from which the ribbon is formed is advanced along a bath of molten metal is characterised in that molten glass is flowed at a controlled rate along a spout towards the bath surface in the direction of advance of the molten glass along the bath, said spout comprising a floor and side jambs, imposing a free fall of the molten glass from the lip of the spout to the bath to ensure that, whereas the glass which has formed the upper surface of the glass on the spout continually flows forwardly into the upper surface of the layer on the bath, the glass which has formed the under surface of the glass on the spout flows rearwardly under the spout and a bottom surface is generated for the glass layer advancing along the bath in which bottom surface distortion derived from physical contact of molten glass with the spout is minimal, regulating the supply to the spout to maintain the formation of the layer of glass on the bath, advancing the molten glass in ribbon form along the bath, and sufficiently cooling the ribbon as it is advanced to permit it to be taken up from the bath and directed through an outlet from the bath by mechanical means.

Further the invention comprehends a method of manufacturing flat glass in ribbon form comprising supplying molten glass at a controlled rate to a bath of molten metal along a channel so as to obtain a free fall of the molten glass from the channel to the bath of molten metal to ensure that, whereas the glass which has formed the upper surface of the glass in the channel continually flows forward into the upper surface of an advancing layer of molten glass on the bath, the glass which has formed the under surface of the glass in the channel flows rearwardly and a bottom surface is generated for the glass layer advancing along the bath in which bottom surface distortion derived from physical contact of molten glass with the channel is minimal, regulating the supply to the channel to maintain the formation of the layer of molten glass on the bath, maintaining said glass layer in molten condition and permitting said layer to flow laterally unhindered to the limit of its free flow under the influence of gravity and surface tension to develop a buoyant body of molten glass on the bath, advancing the buoyant body in ribbon form, and thereafter sufficiently cooling the ribbon as it is advanced to permit it to be taken up from the bath surface, as the cooled ribbon approaches the discharge end of the bath, and discharging the ribbon from the bath by mechanical means.

By such methods of delivering molten glass onto a bath of molten metal, as applied to supply from a pouring spout, that surface of the molten glass which has been in physical contact with the floor and side jambs of the spout is broken up and any contamination from the spout which may be present in it does not mar the under surface of the glass advancing along the bath.

The invention also comprises apparatus for manufacturing flat glass on a bath of molten metal comprising in combination means for producing molten glass, an adjacent tank containing a bath of molten metal, and pouring means for delivering molten glass onto the bath of molten metal, said tank extending in the general direction of flow from the pouring means, said pouring means overlapping the adjacent end wall of the tank and being disposed in spaced relation with the plane of the intended level of the bath, and roller means disposed above the bath level to take up the ribbon of glass approaching the discharge end of the bath and direct the ribbon away from the bath.

In such arrangement the pouring means is a few inches above the surface level of the bath so as to ensure the formulation of a heel of molten glass behind the glass flowing onto the bath.

In order that the invention may be more clearly understood, reference will now be made, by way of example, to the accompanying diagrammatic drawings which illustrate a preferred embodiment of the invention.

In the drawings:

FIGURE 1 is a central longitudinal sectional elevation of apparatus comprising a pouring spout for delivering molten glass into a tank structure confining a bath of molten metal and a superimposed roof structure to the tank and discharge means for taking up a ribbon of glass formed on the bath of molten metal at the discharge end of the tank structure, and FIGURE 2 is a plan view of the inlet end of the apparatus by which molten glass is delivered through the channel of a pouring spout to the bath of molten metal in the tank structure.

Referring to the drawings: a forehearth of a melting tank is indicated at 1, a regulating tweel at 2 and a pouring spout at 3, by which spout molten glass produced in the melting tank is discharged from the melting tank. The spout comprises a lip 4 and side jambs 5, one of which only is illustrated in FIGURE 1, the spout providing a channel of generally rectangular cross section along which the molten glass flows on its way to the bath of molten metal as hereinafter explained.

In known manner a cover may be secured over the spout. A gate 10 is adjustably suspended in known manner by means not shown, in a vertical plane for further regulation of the flow of the molten glass 11 along the spout 3.

As clearly illustrated, in FIGURE 1 the spout 3 overlaps the adjacent end wall 14 of a tank structure holding a molten metal bath 15, preferably molten tin, which tank structure comprises a floor 12, with integral end walls 14 and 42 and side walls 13. The level of the surface of the molten metal bath is indicated at 16. The configuration of the tank structure illustrated is such that the distance between the side walls 13, 13 is at every point along the bath wider than the width of the glass on the bath.

The vertical spacing of the lip of the spout from the surface 16 of the bath, is of the order of a few inches and is such as to ensure a heel 36 being formed behind the glass flowing down the spout to the bath, which heel extends rearwardly under the spout lip 4 to the end wall 14 and has a function hereinafter explained.

The heel is continually supplied with the glass which has been in physical contact with the lip of the spout whilst the main body of glass leaving the channel constituted by the floor and side jambs of the spout is advanced along the bath of molten metal.

The disposal of the lip 4 of the spout in overlapping relation with the adjacent end wall 14 of the tank structure and the disposing of the mouth of the channel a few inches above the surface of the bath obtains a free fall of the molten glass from the channel to the bath of molten metal to ensure that whereas the upper surface of the glass leaving the channel continually flows forward into the upper surface of a layer of molten glass established on the bath, the under-surface flows rearwardly and a bottom surface is generated for the glass layer flowing along the bath as the layer is formed, in which bottom surface distortion derived from physical contact of molten glass with the channel is minimal.

As clearly shown in FIGURE 1, an adjustable end wall 18 may be provided for a roof structure including a roof 17 and side walls 19, and the roof structure may be provided with ducting 39 through which a protecting gas is delivered into the head space over the bath within the roof structure, said ducting being connected by branches 40 to headers 41 through which the protecting gas is fed to the ducting 39. The protecting gas passes under the adjustable end wall 18 to a chamber over the inlet end of the bath, and defined by the ceiling 25 and side walls 26, so that when the layer of glass flowing on the bath flows under conditions described in the aforesaid parent patent application Serial No. 664,245, any exposed parts of the bath are protected by the protecting gas maintained at a plenum in the head space over the bath, and in said chamber over the inlet end of the bath.

The molten metal of which the bath is constituted is at the entry end to each side of the heel covered by a tile 37, which tile extends from the end wall 14 of the tank forwardly to the spout lip 4, thus the surface of the bath under the spout and beyond the lateral limits thereof, which would otherwise be exposed, is protected against access thereto of outside air, by the heel and the juxtaposed tiles 37.

The molten glass delivered to the bath is formed into a layer 24 of molten glass and advanced in ribbon form along the bath while maintaining the glass layer in molten condition and permitting the layer to flow laterally unhindered to the limit of its free flow under the influence of gravity and surface tension to develop a buoyant body of molten glass on the bath. This buoyant body is continuously advanced in ribbon form along the bath and is progressively cooled on the bath by the use of thermal regulators 29 and as it approaches the end wall 42 at the discharge end of the bath, the ribbon is lifted from the surface of the bath by the take-up rollers 27 and a tractive effort is applied to the ribbon of glass through co-operating rollers 27, 28 to advance the glass in ribbon form along the bath to the discharge end thereof. By sufficiently cooling the glass in ribbon form the ribbon of glass 35 diverges from the bath surface and passes unhindered through the outlet 21 defined between the respective end wall 42 of the tank structure and the corresponding end wall of the roof structure.

The actual distance of the free fall from the channel or spout to the surface of the bath of molten metal which is employed depends on the load of glass which is being supplied to the bath, but a free fall from 1½ to 6 inches has been found to be effective for an average rate of flow of glass. As regards the rearward flow of the molten glass, a distance of several inches is conveniently allowed for the formation of the heel.

I claim:

1. A method of manufacturing flat glass in ribbon form during which glass in a molten state is supplied to one end of a bath of molten metal, is advanced forwardly along the bath and during its passage along the bath is sufficiently stiffened by cooling before the glass in ribbon form is discharged from the other end of the bath to permit the ribbon to be taken unharmed from the bath, characterized by delivering molten glass in the form of a sheet-like stream to the surface of the bath of molten metal by a free fall of the molten glass from a channel onto a region of said surface spaced forwardly of the rear end of the bath and causing said stream near said region to separate into (1) a forwardly flowing glass branch layer on the bath with the glass in the upper surface of the body of glass in the channel flowing continuously forward into the upper surface of the glass layer, and (2) simultaneously a rearwardly flowing glass branch layer on said bath with the glass in the under surface of the body of glass in the channel flowing continuously into the upper surface of the rearwardly flowing glass branch layer, thereby dividing the molten glass which is delivered to the bath in two branch layers having two directions of movement and generating for the forwardly flowing branch glass layer a bottom surface in which the distortions due to physical contact of the glass with the channel are minimal, regulating the supply to the channel to maintain the formation of the layers of glass on the bath, advancing the forwardly flowing glass branch layer in ribbon form along the bath, sufficiently cooling the ribbon as it is advanced to permit it to be lifted from the bath surface as the cooled ribbon approaches the discharge end of the bath, and discharging the ribbon from the bath.

2. A method of manufacturing flat glass in ribbon form during which molten glass from which the ribbon is formed is advanced forwardly along a bath of molten metal, characterized in that molten glass is flowed at a controlled rate along a spout towards the bath surface in the direction of advance of the molten glass along the bath, said spout comprising a floor and side jambs, said method comprising delivering molten glass in the form of a sheet-like stream to the surface of the bath of molten metal by a free fall of the molten glass from the lip of the spout onto a region of said surface spaced forwardly of the rear end of the bath and causing said stream to separate near said region (1) a forwardly flowing glass branch layer on the bath with the glass in the upper surface of the body of glass which passes through said spout flowing continuously forward into the upper surface of the glass layer, and (2) simultaneously a rearwardly flowing glass branch layer on said bath with the glass in the under surface of the body of glass which passes through said spout flowing continuously into the upper surface of the rearwardly flowing glass branch layer, thereby dividing the molten glass which is delivered to the bath in two branch layers having two directions of movement and generating for the forwardly flowing branch glass layer a bottom surface in which the distortions due to physical contact of the glass with the spout are minimal, regulating the supply to the spout to maintain the formation of the layers of glass on the bath, advancing the forwardly flowing glass branch layer in ribbon form along the bath, and sufficiently cooling the ribbon as it is advanced to permit it to be taken up from the bath and directed through an outlet from the bath by mechanical means.

3. A method of manufacturing flat glass in ribbon form comprising delivering molten glass at a controlled rate along a channel and in the form of a sheet-like stream to the surface of a bath of molten metal by a free fall of the molten glass from the channel onto a region of said surface spaced forwardly of the rear end of the bath and causing said stream to separate near said region into (1) a forwardly flowing glass branch layer on the bath with the glass in the upper surface of the body of glass in the channel flowing continuously forward into the upper surface of the glass layer, and (2) simultaneously a rearwardly flowing glass branch layer on said bath with the glass in the under surface of the body of glass in the channel flowing continuously into the upper surface of the rearwardly flowing glass branch layer, thereby dividing the molten glass which is delivered to the bath in two branch layers having two directions of movement and generating for the forwardly flowing branch glass layer a bottom surface in which the distortions due to physical contact of the glass with the channel are minimal, maintaining said forwardly flowing glass branch layer in molten condition and permitting the latter layer to flow laterally unhindered to the limit of its free flow under the influence of gravity and surface tension to develop a buoyant body of molten glass on the bath, advancing the buoyant body in ribbon form, and thereafter sufficiently cooling the ribbon as it is advanced to permit it to be taken up from the bath surface as the cooled ribbon approaches the discharge end of the bath, and discharging the ribbon from the bath by mechanical means.

4. A method of manufacturing flat glass in ribbon form comprising delivering glass in molten state through a channel and causing it to fall as a sheet-like stream from the channel onto a region of a bath of molten metal spaced forwardly of the rear end of the bath, dividing, said stream as it reaches the molten bath to form a forwardly extending branch layer of molten glass on said bath in which the top surface of the layer constitutes a continuation of the top surface of the stream discharged from the channel and a rearwardly flowing branch layer of molten glass on said bath in which the top surface constitutes a continuation of the bottom surface of the stream discharged from the channel, whereby the substantial transition of the bottom surface of the stream leaving the channel into the bottom surface of the forwardly extending glass layer is avoided, advancing the forwardly extending glass layer in the form of a ribbon forwardly along the bath, sufficiently cooling the ribbon as it is advanced to permit it to be lifted from the bath surface as the cooled ribbon approaches the discharge end of the bath, and discharging the ribbon from the bath.

References Cited by the Examiner
UNITED STATES PATENTS

| 1,240,185 | 9/1917 | Ewing | 65—341 |
| 1,564,240 | 12/1925 | Hitchcock | 65—182 |

DONALL H. SYLVESTER, *Primary Examiner.*

UNITED STATES PATENT OFFICE
CERTIFICATE OF CORRECTION

Patent No. 3,220,816                      November 30, 1965

Lionel Alexander Bethune Pilkington

It is hereby certified that error appears in the above numbered patent requiring correction and that the said Letters Patent should read as corrected below.

Column 4, line 66, after "region" insert -- into --.

Signed and sealed this 6th day of September 1966.

(SEAL)
Attest:

ERNEST W. SWIDER                      EDWARD J. BRENNER
Attesting Officer                         Commissioner of Patents